Jan. 14, 1930. G. S. COFFIN 1,743,430
SAFETY VALVE
Original Filed May 20, 1922
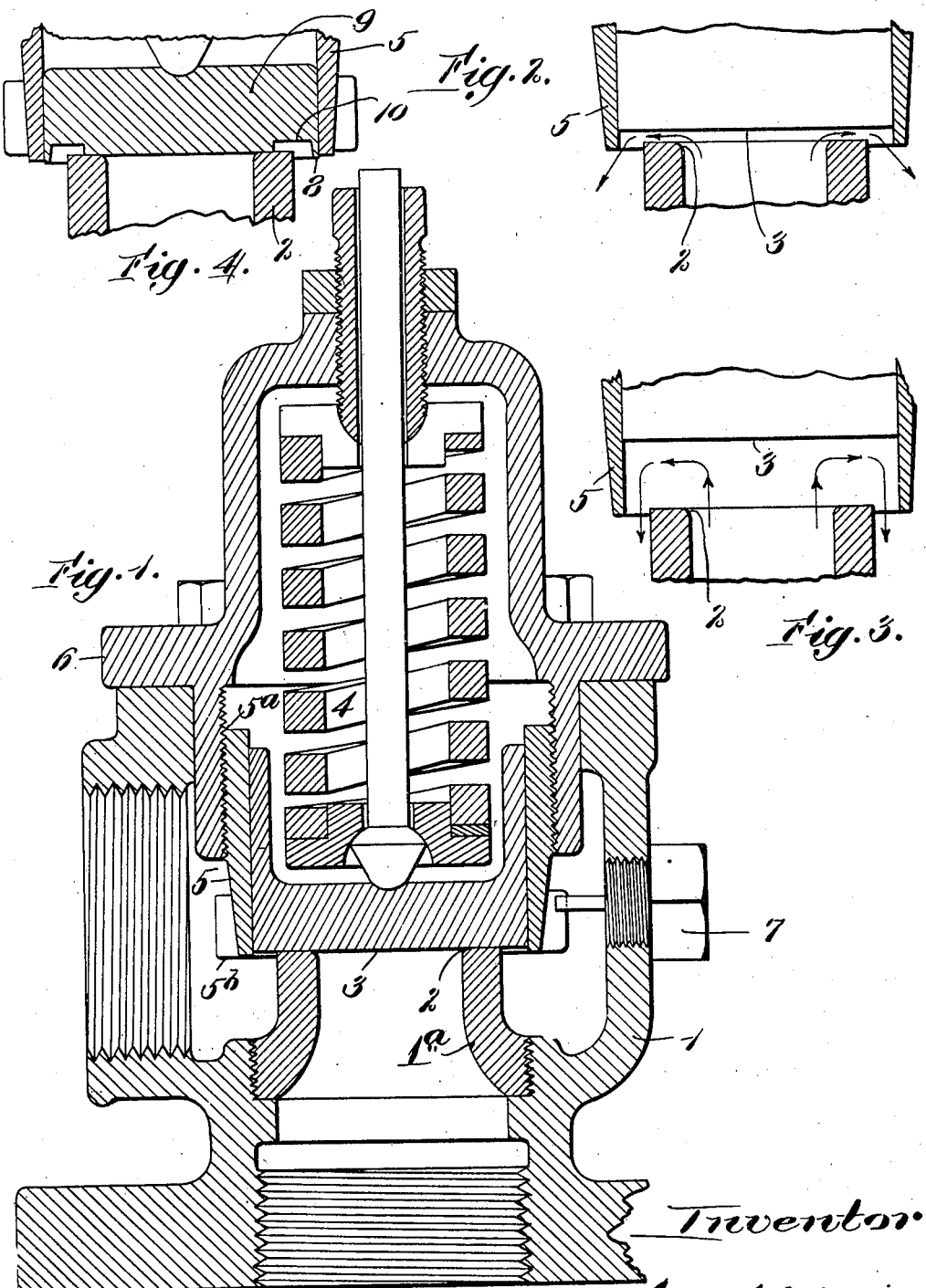

Patented Jan. 14, 1930

1,743,430

UNITED STATES PATENT OFFICE

GRANGE S. COFFIN, OF CHARLESTOWN, MASSACHUSETTS, ASSIGNOR TO CROSBY STEAM GAGE & VALVE COMPANY, OF BOSTON, MASSACHUSETTS, A CORPORATION OF MASSACHUSETTS

SAFETY VALVE

Application filed May 20, 1922, Serial No. 562,522. Renewed September 4, 1929.

This invention relates to safety-valves; and its object is to provide a valve apparatus which, when required to relieve fluid-pressure, especially accumulating pressure, shall be capable of affording full opening for the escape of fluid; that is to say, shall remove substantially all opposition or resistance to flow of fluid through the aperture normally closed by the valve-mechanism. This represents substantially perfect efficiency, since an aperture of any given size and shape has its own maximum limit of delivery capacity.

This object is accomplished in and by the invention herein described, by a valve mechanism or apparatus characterized by an aperture-closer (represented by a disc) which normally closes an aperture (represented by the throat of the apparatus) in the vessel which contains fluid under pressure, an outer terminus of the aperture (represented by the seat) which cooperates with the aperture-closer to close or seal the aperture under normal conditions, and also assists in moving the aperture-closer to an aperture-opening position when an excess of pressure in the vessel over the normal limit is developed; a deflector (represented by an adjustable sleeve) arranged with relation to the aperture seat in such manner as to provide an opening for the escape of fluid at least as capacious as that of the aperture itself, and preferably more capacious, and arranged with relation to the aperture-closer in such manner that, as the closer recedes from the seat, the escaping fluid shall be deflected by the deflector away from the closer, the extent or degree of such deflection increasing and producing a reaction-pressure on the closer which increases in quantity and effect as the closer recedes from the seat; finally, a closer controlling member, (represented by the valve spring) which normally holds the closer on the aperture; and, as the closer recedes from the aperture in response to abnormal fluid pressure, exerts increasing opposing effort which eventually balances the fluid pressures in operation on the closer.

In any duct or passage, through which fluid flows by reason of a pressure differential, there is a portion or region of least delivery-capacity; this portion or region is, for the flow of fluid under any given conditions, the controlling orifice. As the several members of the valve-apparatus herein described physically define a duct or passage through which fluid flows, they also, by changing their relative positions change the physical definition of the duct, and do so in such manner that, at a critical stage in the recession of the closer from the seat, the controlling orifice, of the duct as a whole, initially located at the seat or outer terminus of the aperture and between that and the closer, is transferred to the aperture itself, or such region therein as would constitute the controlling orifice, were there no obstruction outside the aperture to affect the free flow of fluid.

The invention is illustrated by the accompanying drawings, in which: Figure 1 is a central, vertical section of a safety valve embodying the invention; Figs. 2 and 3 are detailed views showing the disc (in elevation) raised to different heights from the seat; and Fig. 4 shows a disc of modified form.

The principal functional members or factors of the valve apparatus, shown in the drawings, are:

The throat; which represents any relief aperture in a pressure-containing vessel, such as a steam boiler.

The disc; which represents any closer or closing member, normally closing the throat, and capable of receding therefrom to afford a relief opening.

The seat; which represents the terminus of the throat, and presents an appreciable surface to the face of the disc.

The sleeve; which represents the deflector.

The valve spring; which represents the pressure confining factor.

In the valve base 1 is disposed the throat 1ª terminated by the seat 2, whereon is seated the disc 3, which is surmounted by the controlling spring 4, all in a well known manner.

The fluid deflecting sleeve 5 is exteriorly threaded at 5ª for engagement with the valve body 6 and is furnished exteriorly with the notched ring 5ᵇ for engagement by set screw 7 mounted in the valve base and adapted to lock the sleeve in any desired position.

The sleeve 5 is thus adjustably affixed to the valve body 6 by threaded engagement therewith and extends downward (Fig. 1) to a plane slightly below that of the seat; and in this sleeve the disc slidingly reciprocates.

The parts are so proportioned and disposed that the annular area included between the upper, outer wall of the seat and the lower, inner wall of the sleeve, or deflecting means, equals, or exceeds the throat area.

The several members of the valve apparatus are shown in Fig. 1 in relative positions which in practice have been found to give full effect to the principles of operation which characterize the working of the apparatus. Theoretically, a slight initial projection of the sleeve or deflector, from, or around, the face of the disc (as indicated in Fig. 1) would initially bring into operation the flow deflection and consequent production of reaction-pressure on the face of the disc; practically, however, when the disc first leaves the seat, such projection of the deflector from the face of the disc is so small in relation to the distance of the deflector from the seat that its flow-deflecting effect is negligible. But as the disc recedes farther from the seat, the initial projection of the deflector, plus the increment of projection due to the further recession of the disc, produces an effective flow deflection and brings into function the consequent reaction pressure on the face of the disc.

The progressive, or step-by-step performance of the valve mechanism here illustrated, may well be explained by supposing that the sleeve or deflector 5 is adjusted from the position shown in Fig. 1 to a point where its lower edge lies in a plane slightly higher than the plane of the seat 2, so that the initial lift of the disc 3 will not unmask the rim of the deflector. Then, when the pressure in the throat 1ª slightly overbalances the counter pressure produced by the valve spring 4, the disc 3 will lift slightly, the fluid under pressure will enter the annular space between the seat 2 and disc 3 and escape radially in all directions, meeting no obstruction to its flow. At this stage, and under these conditions, the expansion pressure at the seat, added to the originally operating static pressure on the central area of the disc, will produce a total lifting pressure on the disc quantitatively greater than the opening pressure, and the disc will be slightly further raised and sustained, the further compression of the spring 4 bringing the operating forces into equilibrium. But, supposing pressure to be accumulating, the disc will continue to recede from the seat, and in receding will uncover the rim of the deflector, and presently the deflection of fluid-flow by the deflector away from the plane of the disc (substantially as indicated in Fig. 2) will produce reaction pressure which, added to the static pressure and expansion pressure already in function, will lift the disc until the increment of counter force produced by compression of the valve spring 4, balances the augmented disc-lifting force. In the two stages of operation above described, the annular space between the seat and the disc persists as the controlling orfice. Assuming that pressure still accumulates, and that consequent increase in static and expansion pressure factors causes the disc to lift still farther, at the same time uncovering more of the wall of the deflector thus enabling it to turn the direction of flow more nearly to a complete reversal of direction (substantially as indicated in Fig. 3), the aggregate of disc-lifting forces will augment to a quantity sufficient to raise the disc to a position where the annular space over the seat becomes effectively equal to or greater than the throat area; then the throat area becomes the controlling orifice, since the space, or cross sectional area between the seat and the deflector is not less than the throat area, and is preferably greater. At the establishment of this third stage of valve-opening, the duct afforded by the relative disposition of the factors in operation, viz: the throat, the disc, the seat, and the deflector is of such character that the discharge of fluid from the container is the maximum which the orifice 1ª is capable of delivering. In short, the valve-apparatus reaches maximum efficiency at this third stage of disc-lift.

When the pressure in the container has been relieved by escape of fluid and the valve disc begins to descend, the reduction of flow deflecting effect (due to diminution of the active or exposed area of the deflector) causes the aggregate of disc sustaining forces to diminish at a rate, or differential, greater than the diminution of static pressure in the container, so that the disc approaches the seat and reduces the effective capacity of the escape-duct in such manner that the disc finally reseats itself with no more loss of pressure by blow down than would have been the case if the valve-apparatus had been required to operate only in the range of the first stage of action above described.

The gradual change in the direction of the discharging fluid, as the disc rises higher and higher, from approximately horizontal to approximately vertical is indicated by the arrows in the different figures.

In Fig. 1 a flat disc and seat are shown, but the principle illustrated by the drawings is equally applicable, irrespective of the shape of the seat, or disc, or deflecting means, and whether or not a huddling chamber is formed by the combination.

In Fig. 4 a modification is shown in which the sleeve 5 extends downwardly to approximately the plane of the seat and in which the lip 8 of the disc 9 extends (when the disc is seated) downwardly to a plane slightly below that of the seat; the lower face of the disc being annularly grooved to form the chamber 10 and annular lip 8 exteriorly of the seat; and here the operation is as follows:

When the disc (normally seated), under a predetermined pressure of the fluid, rises from its seat, the escaping fluid strikes against the lip 8, thereby being deflected downwardly, reacting upwardly against the disc and assisting to raise the disc still higher, thereby exposing the lower interior wall of the sleeve to the action of the fluid, with results substantially like those above described in connection with the example shown in Fig. 1.

By this arrangement a plurality of distinct pop lifts are secured occurring at slightly increasing pressures and giving materially increased discharges at each pop, namely: when the escaping fluid strikes the lip 8; when it strikes the sleeve 5; and when the valve is full open and the throat becomes the controlling orifice.

The drawings show a safety valve disposed in the usual vertical position and the description is of a valve so positioned, but the principle is equally applicable, whatever the position of the valve, the only change being that of the direction taken by the discharging fluid, which direction remains, however, relatively the same. And the claims, though in part drawn with particular reference to a valve occupying the customary vertical position, are all intended to cover those cases in which the valve occupies a position other than vertical.

Among the advantages possessed by the valve which has been described, when the sleeve has been properly adjusted, are these, namely:

The discharge capacity of the valve is greater than that of any known valve, being limited only by the area of the throat and being therefore the maximum obtainable.

The disc reseats, or closes promptly at a pressure but slightly below that at which it originally opened.

Adjustment of the sleeve permits such setting of the valve as to obtain any desired mode of operation, between full lift, at the set pressure, and gradual or progressive opening, where full discharge is obtained only when the pressure has accumulated to a predetermined amount over the set pressure.

It will now be apparent, that the provision of a deflector and closer which are movable in relation to each other (the deflector being so proportioned that the space between it and the seat represents a flow capacity at least as great as that of the throat which is terminated by the seat, and so movable in relation to the closer that as the closer recedes from the seat the effective flow-deflecting surface of the deflector grows in extent) will supply the physical conditions and functional relationships operative to produce in fullest measure the new functional utility, above described, of the valve apparatus as a whole, whether or not these conditions and relationships are exemplified by the herein specifically illustrated structures.

Should the orifice between the deflector and the seat be in effect less than the control orifice of the throat, full measure of utility will not be afforded, though the invention and its values will be exemplified, and delivery capacity up to that afforded by the deflector-seat orifice will be obtainable.

What I claim and desire to secure by Letters Patent is:

1. A safety-valve apparatus, characterized by the combination of an aperture and a seat at the terminus thereof, a closer and a deflector movable in relation to each other to expose the deflector to escaping fluid progressively as the closer recedes from the aperture, the effective orifice between the deflector and the seat being not less than the control-orifice of the aperture.

2. Safety-valve apparatus, characterized by the combination of an aperture and a seat at the terminus thereof, a closer and a deflector movable in relation to each other to augment flow-deflection progressively as the closer recedes from the aperture, the effective orifice between the deflector and the seat being not less than the control-orifice of the aperture.

3. In a safety valve, the combination of a disc, a throat normally closed thereby, a seat for the disc, and fluid deflecting means for increasing the lift of the disc to such a height that the controlling orifice is formed by the throat instead of the seat which originally defined the controlling orifice.

4. In a safety valve, the combination of a throat aperture, a disc normally closing said aperture, a seat for the disc, and a deflector sleeve, the diameter of the disc being greater than that of the seat, the disc slidingly engaging the sleeve, the under face of the disc being annularly grooved to form a chamber, having a peripheral annular lip extending, when the disc is seated, to a plane below that of the end of the sleeve, the orificial area between the end of the sleeve and the seat being not less than the orificial area of the throat aperture.

5. Safety valve apparatus characterized by the combination of an aperture and a seat at the terminus thereof, a deflector sleeve surrounding the seat in spaced relation thereto and having a circular inner bore exposed to escaping fluid and a closer movable within the sleeve to progressively increase flow deflection by the sleeve as the closer recedes from the seat and cause an effective lifting load approaching straight line characteristics.

6. In a safety valve, the combination of a throat aperture, a disc normally closing the aperture, a seat for the disc, mechanism located wholly above the disc for normally retaining the disc in contact with the seat, and a deflector sleeve surrounding and guiding the disc and having a circular inner bore which projects downwardly about the seat and below the plane thereof, to cause useful flow deflection by contact of escaping fluid with the deflector sleeve immediately upon a recession of the disc from the seat.

7. In a safety valve, the combination of a throat aperture, a disc normally closing said aperture, a seat for the disc and a deflector sleeve, the diameter of the disc being greater than that of the seat, the disc slidingly engaging the sleeve, and an annular lip extending downwardly from the disc when the latter is seated to a plane below that of the seat, the orificial area between the end of the sleeve and the seat being not less than the orificial area of the throat aperture.

GRANGE S. COFFIN.